(12) United States Patent
Houston et al.

(10) Patent No.: US 11,245,332 B1
(45) Date of Patent: Feb. 8, 2022

(54) REFERENCE VOLTAGE CONTROL IN A SWITCH MODE POWER SUPPLY

(71) Applicant: Renesas Electronics America Inc., Milpitas, CA (US)

(72) Inventors: Michael Jason Houston, Cary, NC (US); Allan Warrington, Kent (GB)

(73) Assignee: RENESAS ELECTRONICS AMERICA INC., Milpitas, CA (US)

( * ) Notice: Subject to any disclaimer, the term of this patent is extended or adjusted under 35 U.S.C. 154(b) by 7 days.

(21) Appl. No.: 16/785,155

(22) Filed: Feb. 7, 2020

Related U.S. Application Data

(60) Provisional application No. 62/803,385, filed on Feb. 8, 2019.

(51) Int. Cl.
*H02M 3/158* (2006.01)
*H02M 1/088* (2006.01)
*H02M 1/00* (2006.01)

(52) U.S. Cl.
CPC ......... *H02M 3/1582* (2013.01); *H02M 1/088* (2013.01); *H02M 1/0025* (2021.05)

(58) Field of Classification Search
CPC ....... H02M 3/1582; H02M 2001/0016; H02M 1/14; H02M 3/1588; H02M 2001/0009; H02M 2001/0025
See application file for complete search history.

(56) References Cited

U.S. PATENT DOCUMENTS

| 8,710,810 B1 | 4/2014 | McJimsey et al. | |
| 9,413,242 B2* | 8/2016 | Arno | H02M 3/1582 |
| 2009/0115392 A1* | 5/2009 | Shimizu | H02M 3/1582 323/283 |
| 2009/0153118 A1* | 6/2009 | Sato | H02M 3/1582 323/282 |
| 2012/0038334 A1* | 2/2012 | Peng | H02M 3/1588 323/282 |
| 2012/0299568 A1 | 11/2012 | Kumagai et al. | |
| 2013/0200864 A1 | 8/2013 | Huang et al. | |
| 2014/0084883 A1* | 3/2014 | Tanabe | H02M 3/1582 323/271 |
| 2015/0069957 A1* | 3/2015 | Chang | H02J 7/007 320/107 |
| 2015/0194880 A1* | 7/2015 | Wibben | H02M 3/156 323/282 |
| 2015/0372613 A1* | 12/2015 | Houston | H02M 7/04 307/31 |
| 2016/0246316 A1 | 8/2016 | Lim et al. | |
| 2016/0352128 A1* | 12/2016 | Houston | H02M 3/156 |
| 2017/0077817 A1* | 3/2017 | Houston | H02M 3/1582 |
| 2017/0194858 A1 | 7/2017 | Villot et al. | |

(Continued)

*Primary Examiner* — Gustavo A Rosario-Benitez
(74) *Attorney, Agent, or Firm* — Foley & Lardner LLP

(57) ABSTRACT

One or more embodiments relate to a reference voltage control circuit for a buck-boost converter. According to certain aspects, embodiments can increase or decrease the reference voltage for an error amplifier for controlling a pulse width modulation (PWM) signal when there is a change in the mode of operation. In these and other embodiments, the reference voltage control circuit is configured to modify the reference voltage by increasing or decreasing the reference voltage when there is a change in the mode of operation, so as to reduce overshoot or undershoot disturbances in the regulated output voltage during such transitions.

20 Claims, 5 Drawing Sheets

(56) References Cited

U.S. PATENT DOCUMENTS

| | | | |
|---|---|---|---|
| 2019/0120905 A1 | 4/2019 | Wong et al. | |
| 2019/0305688 A1* | 10/2019 | Seymour | H02M 1/42 |
| 2020/0006953 A1* | 1/2020 | Luo | H02J 7/00712 |
| 2020/0099301 A1* | 3/2020 | Itou | G05F 1/46 |
| 2020/0228013 A1 | 7/2020 | Chao | |
| 2020/0228018 A1* | 7/2020 | Wiktor | H02M 3/33507 |

* cited by examiner

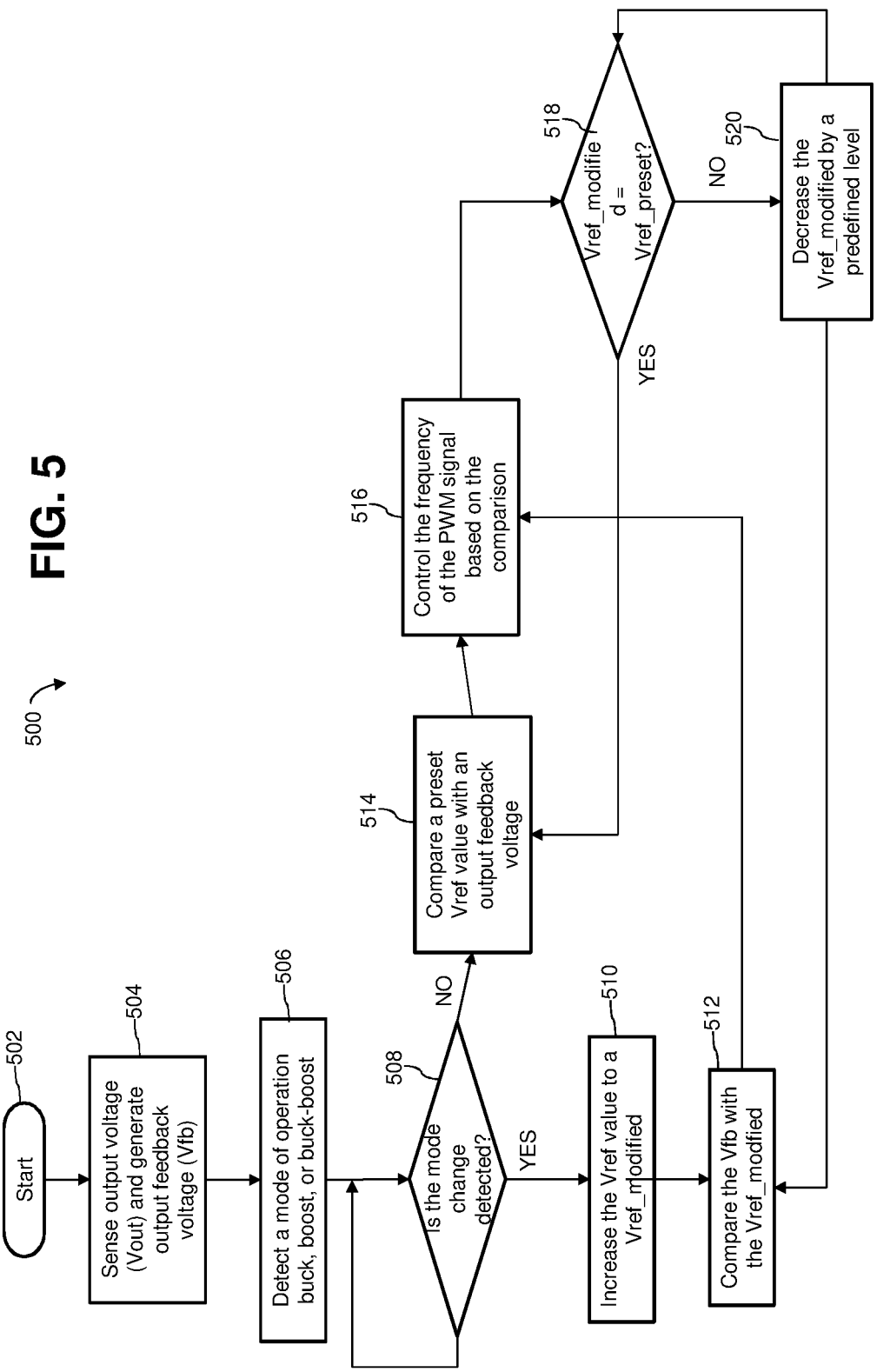

REFERENCE VOLTAGE CONTROL IN A SWITCH MODE POWER SUPPLY

CROSS-REFERENCE TO RELATED PATENT APPLICATIONS

This application claims priority from U.S. Provisional Application No. 62/803,385, filed Feb. 8, 2019, the contents of which are incorporated herein by reference in its entirety.

TECHNICAL FIELD

The present embodiments relate generally to power management and power electronics.

BACKGROUND

Switch mode power converters are widely used in various power applications. Some such power converters, especially buck-boost converters, operate in various modes including various power stage configurations. These buck-boost power converters are required to automatically change modes between buck, boost, or buck-boost during operation while input/output voltage and loading conditions change. Designing circuits for accommodating switching between these various modes can be challenging.

SUMMARY

One or more embodiments relate to a reference voltage control circuit for a buck-boost converter. According to certain aspects, embodiments can increase or decrease the reference voltage for an error amplifier for controlling a pulse width modulation (PWM) signal when there is a change in the mode of operation. In these and other embodiments, the reference voltage control circuit is configured to modify the reference voltage by increasing or decreasing the reference voltage when there is a change in the mode of operation, so as to reduce overshoot or undershoot disturbances in the regulated output voltage during such transitions.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIG. 5 illustrates an example flow diagram of implementation of the reference voltage control circuit of FIG. 3, according to an embodiment of the present disclosure.

DETAILED DESCRIPTION

Figure 1:
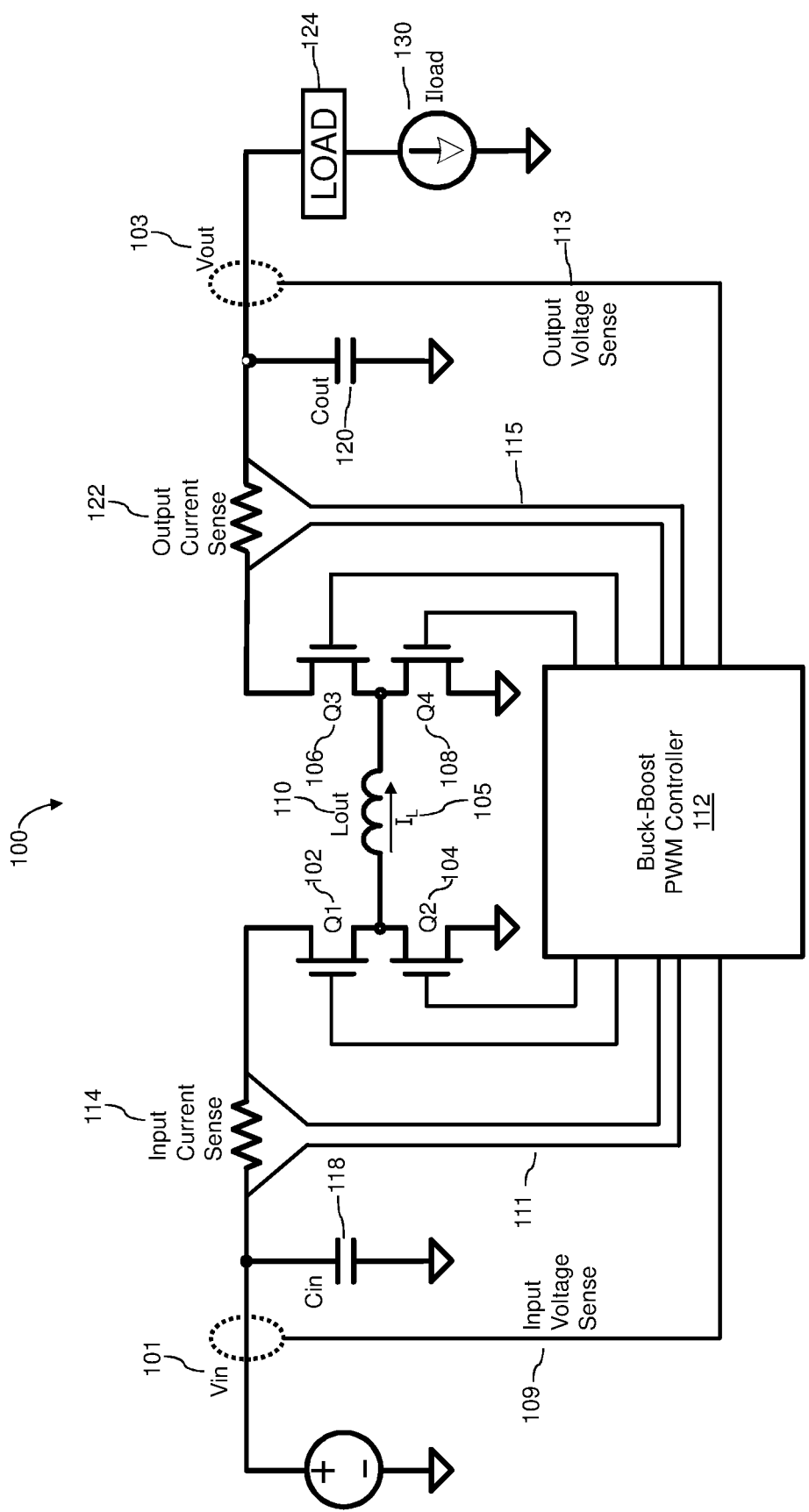
FIG. 1 is a diagram illustrating a standard configuration 100 of a buck-boost power converter.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain aspects, the present Applicant recognizes that buck-boost regulators typically operate in different modes including a buck mode, a buck-boost mode, or a boost mode. As it is well known in the art, in the buck mode the output voltage is typically equal to or lower than the input voltage and in the boost mode the output voltage is typically equal to or higher than the input voltage. The buck-boost converters are typically required to automatically change modes during operation while the input/output voltage and loading conditions are changing. These mode transitions can cause large disturbances in regulation including overshoot and undershoot disturbances.

A buck-boost regulator typically includes a PWM controller that controls the switching transistors in all the three modes via a PWM signal. This is usually implemented using an error amplifier which compares a feedback output voltage to a constant reference voltage, and generates an error signal which is used to modulate the PWM signal. The feedback output voltage can be received via an optocoupler, for example.

It may be further appreciated that the error amplifier is coupled to generate an error signal which can be based on the difference between a sensed output feedback voltage and a pre-set reference voltage. When a buck-boost power converter is operating stably in a particular mode, then the PWM controller may be configured to accommodate a maximum range of error from a desired output voltage as decided by the design. The controller is configured to constantly sense the output voltage and reduce the error between the output voltage and the desired output voltage by adjusting the PWM signal. However, during transitions between modes (e.g. as load conditions change or as the input voltage changes), problems such as overshoot and undershoot of the output voltage can occur.

Embodiments of the present disclosure relate to a method and an apparatus for a reference voltage control circuit for a buck-boost converter which can increase or decrease the reference voltage for an error amplifier for controlling the frequency of a PWM signal when there is a change in the mode of operation, thereby substantially avoiding disturbances such as output voltage overshoot or undershoot.

The reference voltage can have a pre-set value. In one example, the disclosed reference voltage control circuit is responsive to a mode change signal. When a mode change is detected, the reference voltage control circuit can immediately increase or step up the reference voltage to a value higher than the pre-set value and then gradually step it down back to the pre-set value.

Since the reference voltage is modified to be stepped up or stepped down depending on the changed mode, the difference between in the feedback voltage and modified reference voltage is also modified (increased or decreased) causing the error to be modified (increased or decreased) as well. This modification in the error can substantially reduce the overshoot or the undershoot in the regulated output voltage.

FIG. 1 is a diagram illustrating a configuration of a buck-boost converter 100 including an input voltage supply 101, transistors Q1 102, Q2 104, Q3 106, and Q4 108, an inductor Lout 110, a buck-boost PWM controller 112, input capacitor Cin 118, output capacitor Cout 120, an input current sense resistor R1 114, an output current sense resistor R2 122, and a load 124.

The converter 100 is coupled to receive an input voltage Vin 103 from the voltage supply 101 and coupled to provide a regulated output voltage Vout and a regulated output current Iload 130 to a load. The switching of transistors Q1 102, Q2 104, Q3 106, and Q4 108 is controlled by the buck-boost PWM controller 112. An inductor current $I_L$ 105 may pass through the inductor Lout 110 in response to the switching of the transistors. The controller 112 is coupled to receive an input voltage sense signal 109, an input current sense signal 111, an output voltage sense signal 113, and an output current sense signal 115. As may be appreciated by those skilled in the art, the controller 112 may control the turning on and off of the transistors in various ways based on the above mentioned signals. For example, in a typical embodiment, there may be a feedback voltage Vfb generated from the output voltage sense signal 113 which may be compared to a reference voltage Vref (not shown in FIG. 1) and a result of the comparison may be used to control the turning on and off of the transistors to provide the regulated output Vout 107 and current Iload 130.

In general in the converter 100, there can be as many as four control loops including an output voltage control loop, and an output current control loop, an input voltage control loop, and an input current control loop. Any one of four loops can take control and provide regulation of the following signals output voltage, output current, input voltage, or input current.

Figure 2:
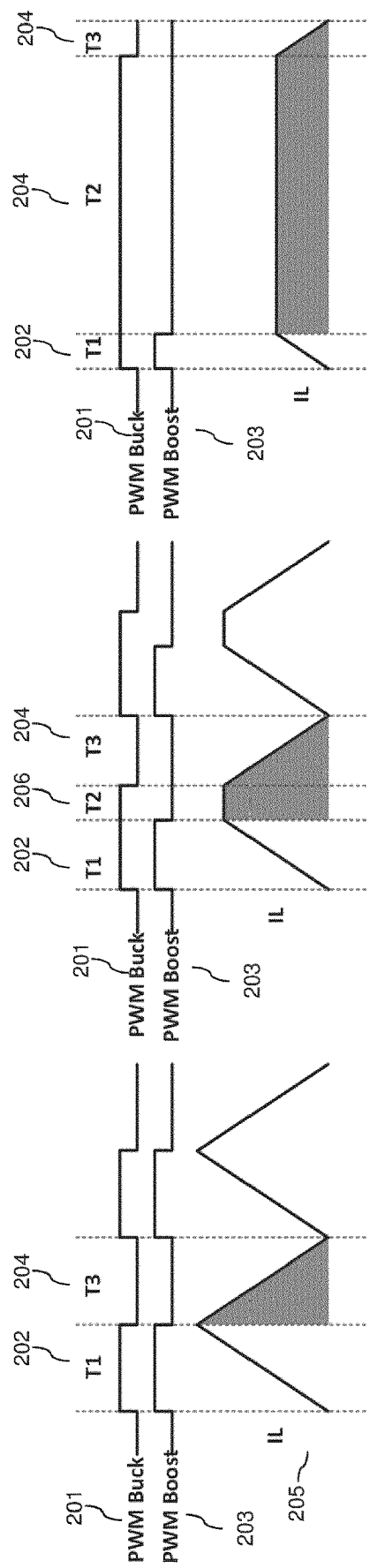
FIGS. 2A, 2B, and 2C are example diagrams illustrating typical PWM waveforms including a PWM buck 201 and a PWM boost 203 and the inductor current $I_L$ 105 of the buck-boost power converter of FIG. 1.

As set forth above, converter 100 can be configured to operate in either a buck mode, a boost mode, or a buck-boost mode of operation, for example depending on the relative values of the input voltage and the output voltage. FIGS. 2A, 2B, and 2C illustrate PWM waveforms during a buck-boost mode of operation, including a PWM buck signal 201 and a PWM boost signal 203 and inductor current $I_L$ 105 of the buck-boost power converter of FIG. 1. In the descriptions below, the PWM buck signal 201 being "on" refers to a condition when the controller causes the transistor Q1 to be turned on while transistor Q2 is turned off. Conversely, the PWM buck signal 201 being "off" refers to a condition when the controller causes the transistor Q1 to be turned off while transistor Q2 is turned on. Likewise, the PWM boost signal 203 being "on" refers to a condition when the controller causes the transistor Q4 to be turned on while transistor Q3 is turned off. Conversely, the PWM boost signal 203 being "off" refers to a condition when the controller causes the transistor Q4 to be turned off while transistor Q3 is turned on.

FIGS. 2A, 2B, 2C illustrate different examples of how a controller can switch between switching states T1, T2, and T3 during a buck-boost mode of operation, and the resulting inductor current $I_L$ 105 in each state. As can be seen from the figures, the state T1 is when both PWM boost and PWM buck are on. The state T2 is when PWM buck is on and PWM boost is off. The state T3 is when PWM buck is off and PWM boost is on.

In the example of FIG. 2A, the controller merely switches between the states T1 and T3 on each PWM cycle. FIG. 2B illustrates one example of switching between all three of the states T1, T2, and T3 during each PWM cycle. FIG. 2C illustrates another example of switching between all three of the states T1, T2, and T3 during each PWM cycle, albeit with a relatively longer duration of the T2 state as compared to the example of FIG. 2B.

Further, as illustrated in the example of FIG. 2A, during the state T1 202, the inductor current $I_L$ 105 increases and during the state T3 204 the inductor current $I_L$ 105 decreases. The load 122 is coupled to the inductor during the state T3 204. In the example of FIG. 2B, during the state T1 202, the inductor current $I_L$ 105 increases. The inductor current $I_L$ 105 may be substantially constant during the state T2 206 and decreases during the state T3 204. The load 122 is coupled to the inductor during the states T2 206 and T3 204. In the example of FIG. 2C, during the state T1 202, the inductor current $I_L$ 105 increases. The inductor current $I_L$ 105 may be substantially constant during the state T2 206 and decreases during the state T3 204. The load 122 is coupled to the inductor during the states T2 206 and T3 204.

As can be appreciated, a lower average current and lower ripple in the current results in a higher efficiency. Accordingly, in the example of FIG. 2A, switching frequency is well controlled but efficiency may be relatively low. In the example of FIG. 2B, frequency can be well controlled and efficiency can be improved. In the example of FIG. 2C, frequency may not be well controlled but efficiency is further improved.

As set forth above, a controller such as PWM controller 112 can monitor conditions such as input and output voltage values, and cause the converter to operate in either a buck, a boost or a buck-boost mode of operation based on the monitored conditions. For example, when the converter is operating in a buck-boost mode of operation (where the input and output voltages are relatively the same), but then the input voltage rises above a threshold value above the target output voltage, the controller 112 can perform a mode transition from the buck-boost mode to the buck mode.

Among other things, the present Applicant has discovered that problems can occur during such mode transitions. In particular, it has been discovered that a large amount of undershoot or overshoot in the target output voltage can occur (e.g. several tens of millivolts when the target output voltage is about 12V). Although these disturbances are only temporary, they can be well outside the specifications for a load. Meanwhile, the present Applicant has discovered that in configurations including an error amplifier, such disturbances can be reduced by adjusting the reference voltage during such mode transitions.

Figure 3:
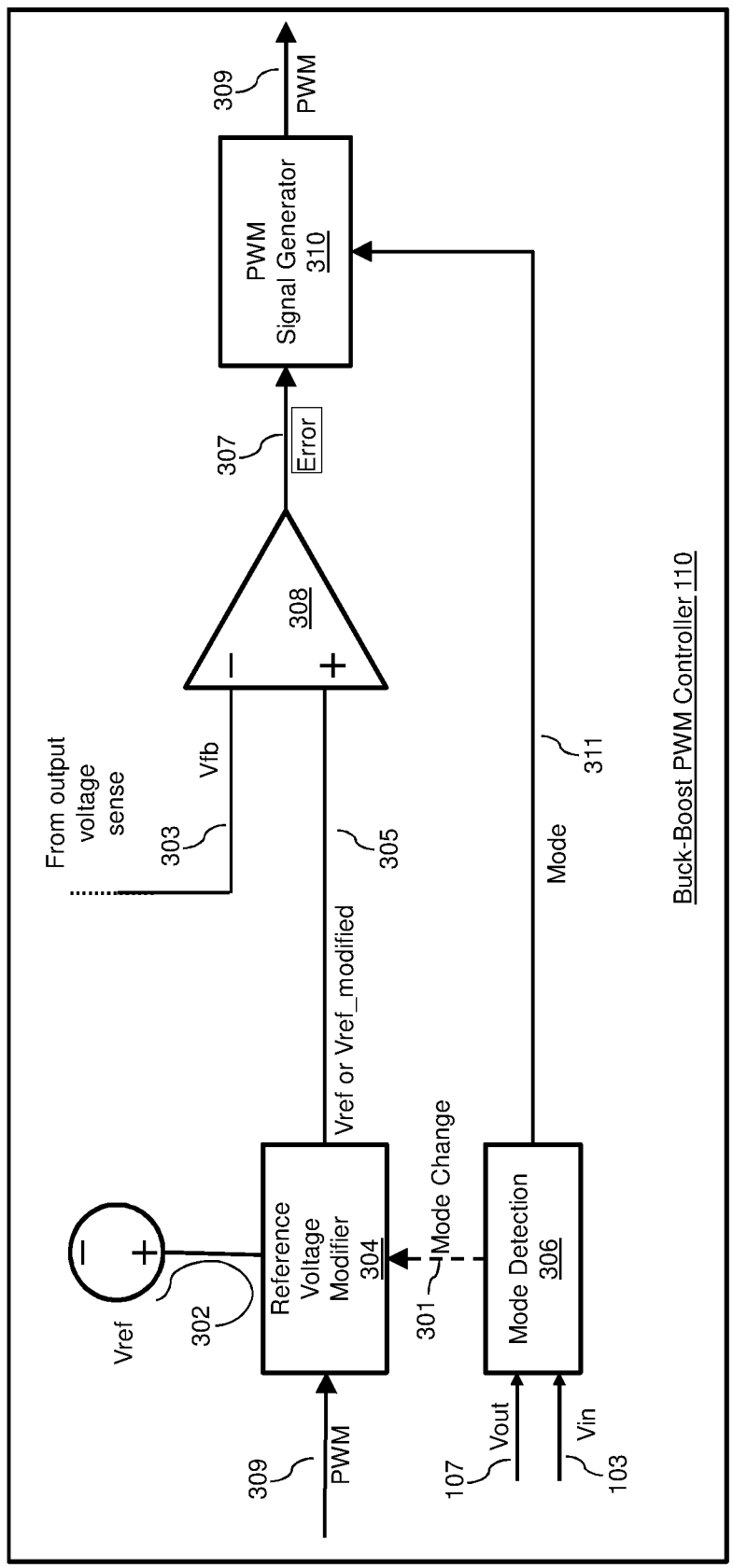
FIG. 3 is a diagram illustrating an example reference voltage control circuit to be included in the buck-boost power converter of FIG. 1, according to an embodiment of the present disclosure.

FIG. 3 is a diagram illustrating an example reference voltage control circuit that can be included in the buck-boost power controller 112 of FIG. 1, according to an embodiment of the present disclosure. FIG. 3 includes a voltage reference 302, a reference voltage modifier circuit 304, a mode detection circuit 306, an error amplifier 308, and a PWM signal generator 310. The voltage reference 302 is configured to provide a reference voltage having an initial value which may also be referred to as a steady-state reference voltage. The mode detection circuit 306 is coupled to receive the input voltage Vin 103 via the input voltage sense signal 109 and the output voltage Vout 107 via the output voltage sense signal 113. Furthermore, the mode detection circuit 306 is configured to detect a mode of operation of the converter 100 for example, a buck mode, a boost mode, or a buck boost mode and indicate the same via a mode signal 311; and further signal a change of mode or operation via mode change signal 301. In one example, the mode change signal 301 may become active when a mode change is detected or it may be inactive. The mode detection circuit 306 may be realized using any combinational or sequential logic using comparators, etc. In one example, an active mode change signal may be a logic high signal and an inactive mode change signal may a logic low signal or vice versa.

The reference voltage modifier circuit 304 is coupled to receive the voltage Vref 302 and also the mode change signal 301; and configured to output either the Vref 302 or a modified value of the Vref_modified 305 as will be explained below.

In one example, if a mode change is detected, then the reference voltage modifier circuit 304 is configured to modify the value of the Vref 302 to a Vref_modified 305. In other words, the reference voltage modifier circuit 304 is configured to modify the value of Vref 302 in response to the mode change signal 301. If the mode change signal 301 is active, then the value Vref 302 is modified and if the mode change signal 301 is inactive, the value of Vref 302 may not be modified. It may be appreciated by those skilled in the art that when a mode change is detected, the converter 100 may enter a new mode of operation from the current mode. For example, a boost mode may be changed to buck mode or a buck-boost mode. Similarly, a buck mode can be changed to a buck-boost or a boost depending on the output voltage or output current requirement or both.

In one example, the reference voltage modifier circuit 304 is configured to increase or decrease the value of the Vref 302 depending on the new mode of operation. The value of Vref 302 may also be increased or decreased in steps. In one example, the Vref 302 may be decreased by analog filtering. In other words, the value of Vref_modified 305 can be higher or lower than the Vref 302 if the mode change signal 301 is active. Furthermore, in one example, the value Vref_modified 305 may be gradually be made equal to the Vref 302 in incremental or decremental steps. For example, if Vref_modified 305 is initially increased, then it can be gradually decreased over time made equal to the Vref 302 or vice versa. The value of Vref_modified 305 can be equal to the Vref 302 if the mode change signal 301 is inactive. The reference voltage modifier circuit may be implemented using a multiplexer or a similar circuit which can allow either the voltage Vref 302 or Vref_modified 305 to be provided to the error amplifier. The PWM signal generator 310 may be implemented using any one of many known techniques. In one example, if a mode change is detected before the Vref_modified has returned to its original value Vref 302, then it is stepped up again before resuming decay back to the set point.

In general, the initial step value may be higher or lower than the Vref 302 by a small percentage. Furthermore, the value of each decremental step may be such that the total time taken to return to the original value of Vref 302, also referred to as decay time, is consistent with the loop bandwidth of the power converter. In one example, if the Vref 302 is initially increased, then the value of an initial step voltage may be two or five percent higher than Vref 302.

The error amplifier 308 is configured to compare a feedback voltage Vfb 303 with the Vref_modified 305 voltage which can be either be equal to the value Vref 302 or may be higher or lower. In one example, the error amplifier is coupled to receive the feedback voltage Vfb 303 at its inverting terminal and the Vref_modified 305 at its non-inverting terminal; and coupled to generate an error signal 307 based on the comparison. The error signal 307 is further provided to the PWM signal generator 310 which is configured to generate a PWM signal 309. The frequency and/or other parameters of the PWM signal 309 are configured to vary in response to the error signal 309. Referring back briefly to FIG. 2, the PWM signal 309 can be the PWM buck signal 201 or the PWM boost signal 203. In some examples, there can be a plurality of PWM signal generators for various PWM signals. In one example, the PWM signal 309 is fed back to the reference voltage modifier circuit 304. In one example, when a mode change is detected, the Vref 302 may be stepped up on the following active pulse of the PWM signal 309; and may be stepped down successively on the subsequent active PWM pulses. Similarly, when a mode change is detected, the Vref 302 may be stepped down on the following active pulse of the PWM signal 309; and may be stepped up on the subsequent PWM pulses.

As can be appreciated, in the absence of a mode change, the value of the Vref_modified 305 is equal to Vref 302, therefore, the error signal 307 is generated based on a comparison of the steady-state value Vref 302 and the feedback voltage Vfb 303. Whereas, if a mode change is detected, then the error signal 307 is generated based a comparison of the modified value of the Vref 302 and the feedback voltage Vfb 303. Thus, in case of a mode change, the error signal 307 may be changed too. This change in the value of error signal can cause a change in the frequency of modulation of the PWM signal 309 thereby avoiding any overshoot or undershoot. The Vref_modified 305 can then be gradually be made to become equal to the Vref 302 in steps to begin normal operation.

The feedback voltage Vfb 303 in the above implementation is the sensed output voltage, so it follows that it the above implementation is an example of an output voltage control loop to provide a regulation of the output voltage Vout 107. In another example, the reference voltage modifier circuit 304 can be implemented to regulate the output current Iload 130. Furthermore, there can be implementations with an output current control loop or an input voltage control loop or an input current control loop to provide regulation of any of following parameters or signals output voltage, output current, input voltage, or input current.

In various examples, implementations of the circuit shown in FIG. 3 can be used to prioritize limited overshoots or undershoots depending on the application in which the power converter is used. For example, in case of voltage regulators, the circuit may be designed to limit an undershoot of output voltage. As another example, in case of battery chargers the circuit may be designed to limit an overshoot of charge current or adapter current.

In the case of an output voltage regulation, priority is to limit an undershoot. When a mode change is detected, the voltage reference is stepped up and then gradually stepped back down with digital steps or with analog filtering. The decay time consistent with the loop bandwidth.

Additionally, in one example, the circuit of FIG. 3 can be implemented separately for generating separate PWM signals such as PWM buck signal or PWM boost signal or a PWM buck-boost signal. In another example, the PWM signal generator 310 can be used to generate three separate PWM signals for each mode. Any other suitable variations of this implementation are also possible.

Figure 4:
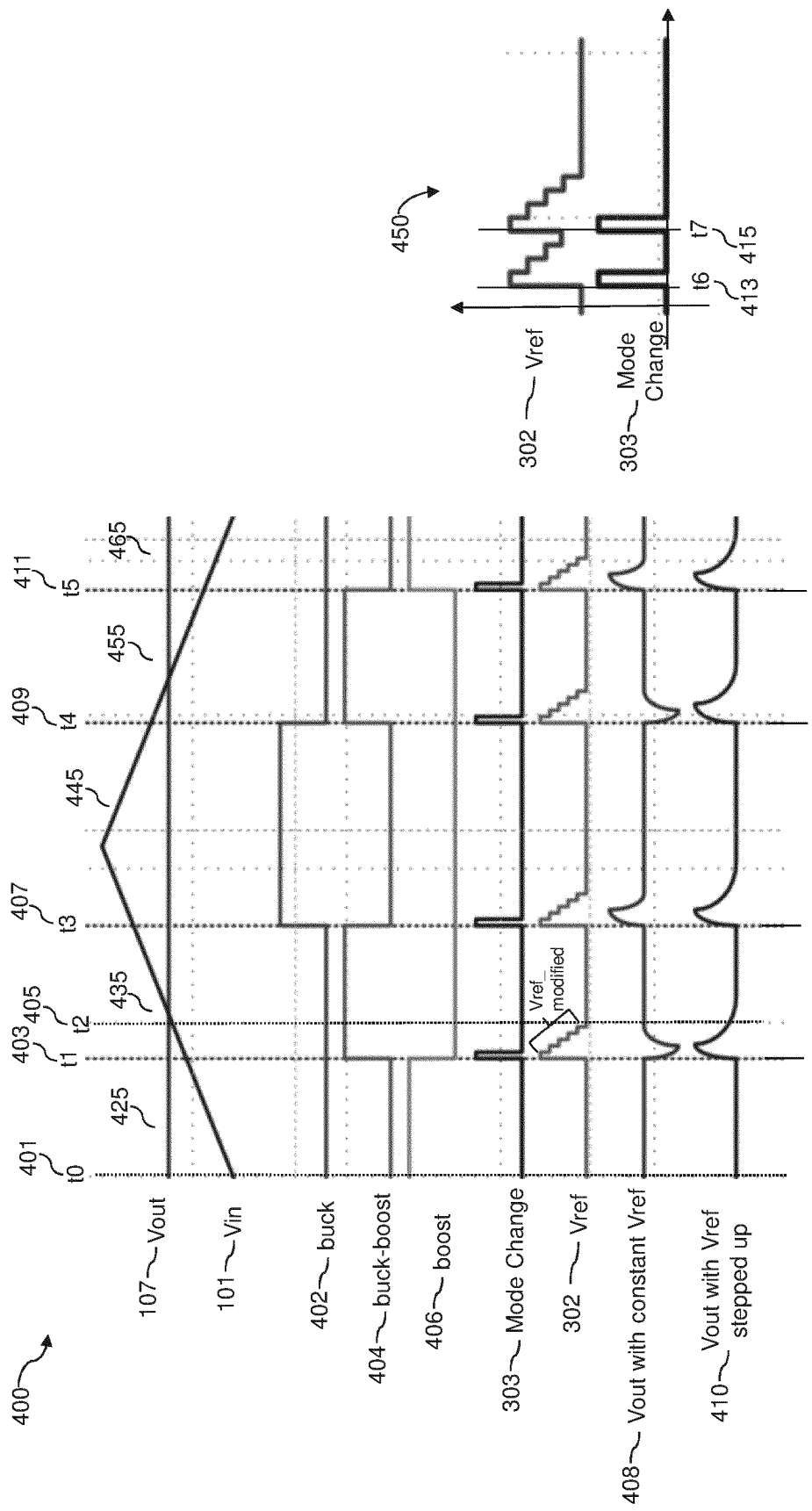
FIG. 4 is a diagram illustrating example waveforms associated with a buck-boost converter including the circuit of FIG. 3, according to an embodiment of the present disclosure.

FIG. 4 is a diagram illustrating various modes and various parameters and signals associated with a buck-boost converter 100 including the circuit of FIG. 3, according to an embodiment of the present disclosure.

Illustrated in FIG. 4 are the output voltage Vout 107, the input voltage Vin 101, a buck signal 402, a buck-boost signal 404, and a boost signal 406, the mode change signal 303, a signal Vout with a constant Vref 408, and a Vout with stepped up Vref signal 410. The buck signal 402, the buck-boost signal 404, and the boost signal 406 are exemplary signals which indicate a mode a particular mode of the converter 100. In one example, a logic high value of any signal may mean that it is enabled and a logic low value of any signal may mean that it is disabled.

Various portions of the FIG. 4, including 425, 435, 445, 455, and 465 illustrate various modes of the converter 100.

Prior to line t0 in the portion 401, it may be assumed that the converter 100 is operating in a boost mode as indicated by the high value of the PWM boost signal 406. From the line t0 401 until the line t1 403, the Vout 107 is substantially higher than Vin 101 indicating that the converter 100 is operating in the boost mode. During this time the boost signal 406 is enabled; and the buck signal 402 and buck-boost signal 404 are disabled.

At line t1 403, the Vout 107 is very close to the Vin 101 indicating that the converter is entering a buck-boost mode. This is indicated by the mode change signal 303 becoming momentarily high. This is also accompanied by the boost signal 406 becoming low and the buck-boost signal 404 becoming high.

As can be seen, at line t1 403, in accordance with an embodiment of the present disclosure, as the mode is changed, the Vref 408 is stepped up to a value higher than its original value Vref_modified 305, which is further stepped down by a predefined value or a step until the line t2 405. The Vout signal with constant Vref signal 408 illustrates what the output voltage Vout would be if the reference voltage was not stepped up. As can be seen there is an undershoot at line t1 403 on the waveform 408 when Vref is maintained constant or not stepped up. However, the waveform 412 illustrates how the undershoot is avoided and instead Vout has positive value which is slightly higher than the ideal value of the Vout as indicated by Vout 107. Furthermore, from the line t1 403 until line t2 405 the slightly higher value of Vout is gradually reduced as the Vref_modified 305 is gradually stepped down until line t4 409.

At line t4 409, another mode change is sensed. The mode change signal 303 becomes momentarily high. The input voltage Vin 101 gradually increases and becomes higher than output voltage Vout 107, indicating that the converter 100 is entering a buck mode. The Vref 302 is stepped up and then gradually stepped down. Because of this, the undershoot in Vout is avoided.

In between when there are mode changes such as at times t3 407 and t5 411, even in the absence of a potential undershoot, the output voltage is improved. The waveform Vout with stepped up Vref signal 410 is much smoother as the Vref 302 is gradually stepped down.

Additionally shown in FIG. 4 is an example waveform diagram 450 in which the Vref 302 is stepped up at line t6 453 and before it is stepped down completely to its original value, a mode change is detected at line t7 415 as indicated by a pulse of the mode change signal 303. In such a scenario, the Vref 302 is stepped up again at line t7 415. In one example, the lines t6 413 and t7 415 can be time instants at which the Vref 302 is stepped up.

FIG. 5 illustrates an example flow diagram 500 of implementation of the reference voltage control circuit of FIG. 3 to be included in the converter 100 of FIG. 1, according to an embodiment of the present disclosure. The flow diagram 500 illustrates an example method for the buck-boost PWM controller 112 to increase or decrease the reference voltage during mode changes.

As can be seen, after starting at block 502, the input voltage 103 and output voltage 107 may be sensed. Also a feedback voltage Vfb 303 may be generated at block 504 and the method may proceed to block 506.

At block 506, a mode of operation such as buck, boost, or buck-boost may be detected based on the values of Vin and Vout. The method may then proceed to block 508.

At block 508, it may be checked if a mode change is detected. If so, then the method may proceed to block 510. If not, then the method may proceed to block 514. It can also keep checking simultaneously if the mode is being changed of is changed.

Referring back to FIG. 3, an example of the above blocks 506, 508 is shown the mode detection circuit 306.

At block 510, the reference voltage may be stepped up to the Vref-modified 305. Then the method proceed to block 512.

At block 512, Vfb 303 is compared with the Vref_modified 305. The method then proceeds to block 516.

At block 514, since no mode change is detected, the feedback voltage Vfb 303 is compared with the steady-state value of Vref 302. The method then proceeds to block 516.

At block 516, the PWM signal may be controlled based on the result of the comparison, to control the switching of one or more of the transistors Q1 102, Q2 104, Q3 106, and Q4 108 to regulate the output voltage Vout 107. The method then proceeds to block 518.

At block 518, it may be checked if Vref_modified 305 is equal to the Vref 302. If so, then the method proceeds to block 514. If not, then the method proceeds to block 520.

At block 520, the Vref_modified 305 may be decreased in predefined steps. After each decreased step, the method may go back to the block 512 and compare the stepped down value of the Vref_modified 305 with the Vfb 303 to further control the frequency of the PWM signal based on the recent comparison.

In the above specification, the terms "power converter" and "power supply" may be used interchangeably to mean the same thing. The terms "coupled to", "configured to", "operable to" may be used interchangeably to mean the same thing.

In the above specification, the terms "reference voltage control circuit" and "reference voltage modifier circuit" may be used interchangeably to mean the same thing. The terms "coupled to", "configured to", "operable to" may be used interchangeably to mean the same thing.

In the above specification, some common electronic circuits such as flip-flops or other digital circuits may be clocked by on-chip oscillators derived from phase locked loops (plls), crystal oscillators or any other conventional methods of generating a clock. In other embodiments, the clocks could be external as well.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A controller for a power converter coupled to receive an input voltage and an input current, and coupled to provide an output voltage and an output current to a load, the power converter comprising an inductor and a plurality of transistors coupled to the inductor, the controller being configured to:
   operate a power converter by a PWM signal in a boost mode if an output voltage of the power converter is higher than an input voltage of the power converter;
   operate the power converter by the PWM signal in a buck mode when the output voltage is lower than the input voltage;
   operate the power converter by the PWM signal in a buck-boost mode when the output voltage is substantially equal to the input voltage;
   change, by the converter, a mode of the power converter between the boost mode, the buck mode, and the buck-boost mode;
   generate an error voltage equal to a difference between a reference voltage and a sensed parameter, when the mode change signal is inactive;
   control the PWM signal by the error voltage, when the converter is operating in the buck mode, the boost mode, and buck-boost mode;
   generate a modified error voltage equal to a difference between a modified reference voltage and the sensed parameter, when the mode change signal is active on an active edge of the PWM signal;
   control the PWM signal by the modified error voltage, when the converter changes the mode to avoid any overshoot or undershoot of the output voltage; and
   reduce the modified reference voltage stepwise on each successive active edge of the PWM signal until the modified reference voltage is substantially equal to the reference voltage.

2. The controller according to claim 1 comprising:
   a mode detection circuit coupled to compare the input voltage and the output voltage and generate a mode signal and a mode change signal,
   a voltage reference configured to generate the reference voltage,
   a reference voltage modifier circuit coupled to provide either the reference voltage or a modified reference voltage,
   an error amplifier coupled to generate the error voltage, or the modified error voltage, and
   a PWM signal generator coupled to generate the PWM signal controlled by the error voltage or the modified error voltage.

3. The controller according to claim 2,
   wherein the mode detection circuit is configured to indicate the mode of the converter via the mode signal,
   wherein the mode detection circuit is further configured to detect a mode change of the converter when the converter changes the mode and make the mode change signal active if a mode change is detected and make the mode change signal inactive if a mode change is not detected.

4. The controller according to claim 3, wherein the reference voltage modifier circuit is configured to provide the reference voltage to the error amplifier when the mode change signal is inactive to generate the error voltage, and
   wherein the reference voltage modifier circuit is configured to modify the reference voltage to the modified reference voltage and provide the modified reference voltage to the error amplifier when the mode change signal is active on the active edge of the PWM signal to generate the modified error voltage.

5. The controller according to claim 1 wherein:
   the modified reference voltage is higher than the reference voltage.

6. The controller according to claim 1 wherein:
   the modified reference voltage is substantially equal to the reference voltage.

7. The controller according to claim 1 wherein:
   the sensed parameter is the output voltage sensed via an output voltage sense circuit.

8. The controller according to claim 1 wherein:
   the sensed parameter is the output current sensed via an output current sense circuit.

9. The controller according to claim 1 wherein:
   the sensed parameter is the input voltage sensed via an input voltage sense circuit.

10. The controller according to claim 1 wherein:
    the sensed parameter is the input current sensed via an input current sense circuit.

11. A method for avoiding or limiting overshoot or undershoot of an output voltage of a power converter by a controller, the method comprising:
    operating a power converter by a PWM signal in a boost mode if an output voltage of the power converter is higher than an input voltage of the power converter;
    operating the power converter by the PWM signal in a buck mode when the output voltage is lower than the input voltage;
    operating a power converter by the PWM signal in a buck-boost mode when the output voltage is substantially equal to the input voltage, voltage;
    changing, by the converter, a mode of the power converter between the boost mode, the buck mode, and the buck-boost mode;
    generating an error voltage equal to a difference between a reference voltage and a sensed parameter, when the mode change signal is inactive;
    controlling the PWM signal by the error voltage, when the converter is operating in the buck mode, the boost mode, and buck-boost mode;
    generating a modified error voltage equal to a difference between a modified reference voltage and the sensed parameter, when the mode change signal is active on an active edge of the PWM signal;
    controlling the PWM signal by the modified error voltage, when the converter changes the mode to avoid any overshoot or undershoot of the output voltage; and reducing the modified reference voltage stepwise on each successive active edge of the PWM signal until the modified reference voltage is substantially equal to the reference voltage.

12. The method according to claim 1 wherein the controller comprises:
a mode detection circuit coupled to compare the input voltage and the output voltage and generate a mode signal and a mode change signal,
a voltage reference configured to generate the reference voltage,
a reference voltage modifier circuit coupled to provide either the reference voltage or a modified reference voltage,
an error amplifier coupled to generate the error voltage, or the modified error voltage, and
a PWM signal generator coupled to generate the PWM signal controlled by the error voltage or the modified error voltage.

13. The method according to claim 12, further comprising:
indicating by the mode detection circuit the mode of the converter via the mode signal, and further detecting by the mode detection circuit a mode change of the converter when the converter changes the mode;
making the mode change signal active if a mode change is detected; and
making the mode change signal inactive if a mode change is not detected.

14. The method according to claim 13 further comprising,
providing by the reference voltage modifier circuit, the reference voltage to the error amplifier when the mode change signal is inactive to generate the error voltage,
providing by the reference voltage modifier circuit the modified reference voltage to the error amplifier when the mode change signal is active on the active edge of the PWM signal to generate the modified error voltage.

15. The method according to claim 11 wherein:
the modified reference voltage is higher than the reference voltage.

16. The method according to claim 11 wherein:
the modified reference voltage is substantially equal to the reference voltage.

17. The method according to claim 11 wherein:
the sensed parameter is the output voltage sensed via an output voltage sense circuit.

18. The method according to claim 11 wherein:
the sensed parameter is the output current sensed via an output current sense circuit.

19. The controller according to claim 11 wherein:
the sensed parameter is the input voltage sensed via an input voltage sense circuit.

20. The controller according to claim 11 wherein:
the sensed parameter is the input current sensed via an input current sense circuit.

* * * * *